Figure 1:
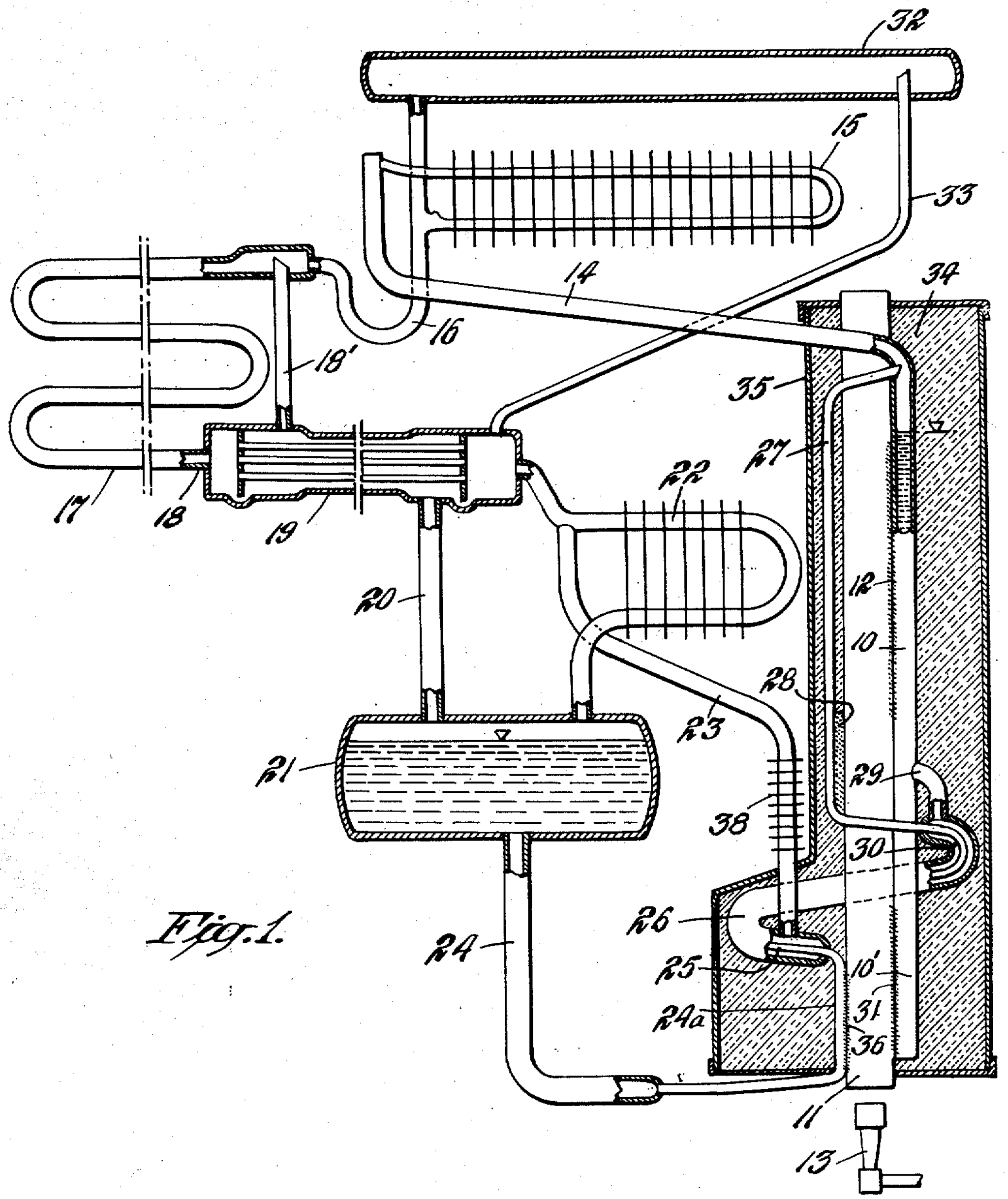

July 2, 1957 W. G. KOGEL 2,797,555

ABSORPTION REFRIGERATION

Filed Aug. 21, 1952 2 Sheets-Sheet 1

INVENTOR.

Wilhelm Georg Kogel

Edmund A Fenander

BY his ATTORNEY

July 2, 1957 W. G. KOGEL 2,797,555

ABSORPTION REFRIGERATION

Filed Aug. 21, 1952 2 Sheets-Sheet 2

INVENTOR.

Wilhelm Georg Kogel

BY Edmund A Fenander his ATTORNEY

United States Patent Office 2,797,555
Patented July 2, 1957

2,797,555

ABSORPTION REFRIGERATION

Wilhelm Georg Kogel, Stockholm, Sweden, assignor to Aktiebolaget Elektrolux, Stockholm, Sweden, a corporation of Sweden Application August 21, 1952, Serial No. 305,574

Claims priority, application Sweden September 22, 1951

18 Claims. (Cl. 62—119.5)

My invention relates to refrigeration systems of the absorption type and more particularly to such systems in which an inert gas or pressure equalizing agent is employed.

It is an object of my invention to effect improvements in the manner in which fluids are circulated in systems of this type, particularly to provide new arrangements for utilizing heat dissipated from the vapor expulsion unit or generator and derived from a heat source external to the system to promote heating of absorption liquid enriched in refrigerant prior to introducing such rich absorption liquid into the vapor expulsion unit.

More particularly, it is an object to provide such new arrangements in which heat dissipated from the vapor expulsion unit or generator is utilized to heat absorption liquid enriched in refrigerant at a region in its path of flow from which the heated rich absorption liquid flows in thermal exchange relation with absorption liquid weak in refrigerant before entering the vapor expulsion unit or generator.

A further object of the invention is to provide such new arrangements in which heat dissipated from the vapor expulsion unit or generator is utilizied to heat absorption liquid weak in refrigerant and flowing from the vapor expulsion unit, and then flowing such heated weak absorption liquid in thermal exchange relation with rich absorption liquid from the absorber to the vapor expulsion unit.

A still further object is to provide a heat exchanger for absorption liquid and connections therefor which are arranged in a compact manner in the immediate vicinity of the vapor expulsion unit and in which heat dissipated from the vapor expulsion unit is utilized to heat such connections to boost the heat capacity of weak absorption liquid which in turn is given up to the rich absorption liquid in the liquid heat exchanger, so that the rich absorption liquid will enter the vapor expulsion unit at a higher temperature.

Figures 2, 3:
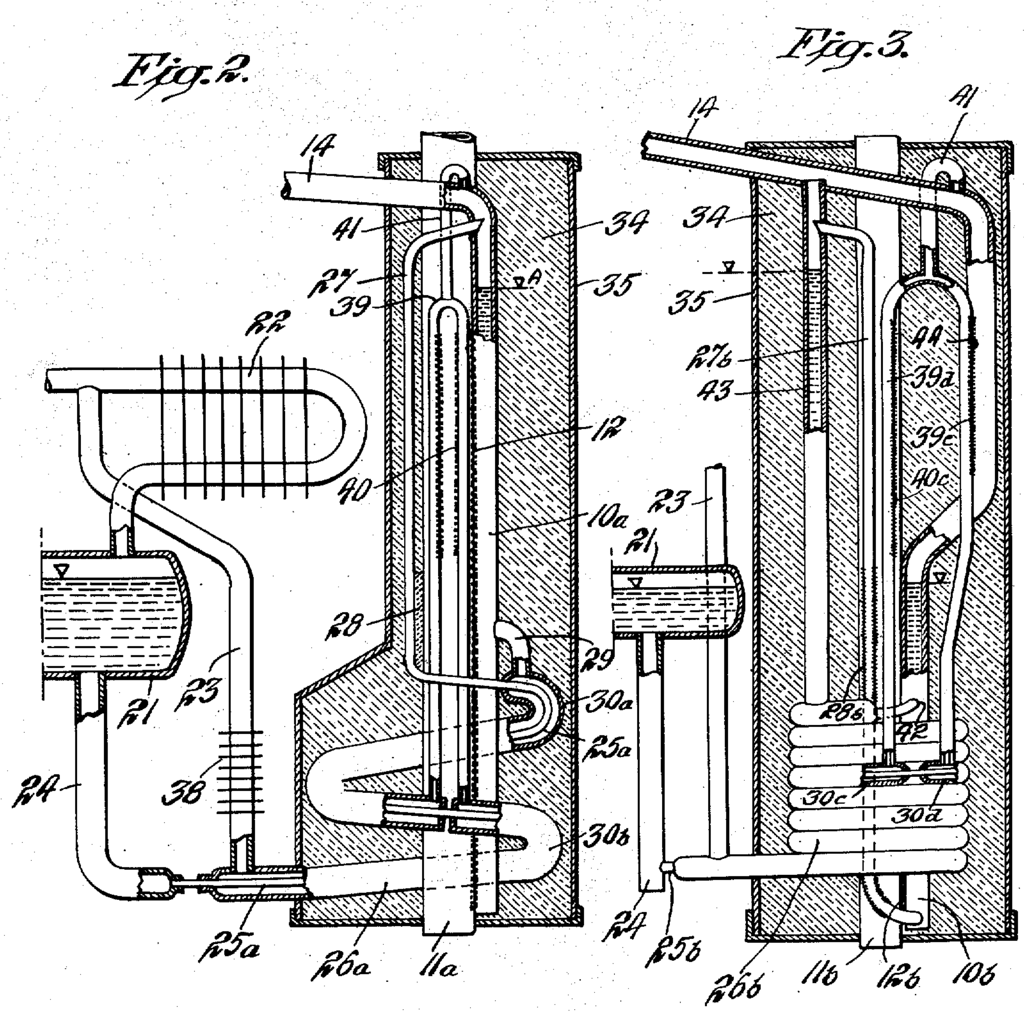

The novel features which I believe to be characteristic of my invention are set forth with particularity in the claims. The invention, both as to organization and method, together with the above and other objects and advantages thereof, will be better understood by reference to the following description taken in connection with the accompanying drawing forming a part of this specification, and of which:

Fig. 1 more or less diagrammatically illustrates an absorption refrigeration system embodying the invention; and Figs. 2 and 3 are fragmentary views of refrigeration systems like that shown in Fig. 1 diagrammatically illustrating other embodiments of the invention.

Referring to Fig. 1, I have shown my invention in connection with an absorption refrigeration system of a uniform pressure type which is well known in the art and in which an inert pressure equalizing gas is employed. Such a refrigeration system comprises a generator or vapor expulsion unit comprising a boiler 10 containing a refrigerant, such as ammonia, in solution in a body of absorption liquid, such as water. Heat is supplied to the boiler 10 from a heating tube 11 thermally connected therewith at 12, as by welding, for example. The heating tube 11 may be heated in any suitable manner, as by an electrical heating element or by a liquid or gaseous fuel burner 13 which is adapted to project its flame into the lower heat input end of the tube.

The heat supplied to the boiler 10 and its contents expels refrigerant vapor out of solution, and the expelled vapor passes upwardly through a conduit 14 into an air cooled condenser 15 in which it is condensed and liquefied. Liquid refrigerant flows from condenser 15 through a conduit 16 into a cooling element 17 in which it evaporates and diffuses into an inert pressure equalizing gas, such as hydrogen, which enters through a conduit 18. Due to evaporation of refrigerant fluid into inert gas, a useful refrigerating effect is produced by cooling element 17 with consequent absorption of heat from the thermally segregated surroundings.

The rich gas mixture of refrigerant vapor and inert gas formed in cooling element 17 flows from the upper part thereof through a conduit 18′, a passage of gas heat exchanger 19, conduit 20 and absorber vessel 21 into the lower end of an absorber coil 22. In absorber coil 22 the rich gas mixture flows countercurrent to downwardly flowing absorption liquid which enters through a conduit 23. The absorption liquid absorbs refrigerant vapor from inert gas, and inert gas weak in refrigerant flows from absorber coil 22, another passage of gas heat exchanger 19 and conduit 18 into the lower end of cooling element 17.

The circulation of gas in the gas circuit just described is due to the difference in specific weight of the columns of gas rich and weak, respectively, in refrigerant vapor. Since the column of gas rich in refrigerant vapor and flowing from cooling element 17 to the absorber coil 22 is heavier than the gas weak in refrigerant and flowing from absorber coil 22 to cooling element 17, a force is produced or developed within the system for causing circulation of gas in the manner described.

Absorption solution enriched in refrigerant flows from the absorber vessel 21 through a conduit 24 and inner pipe or passage 25 of a liquid heat exchanger 26. Rich absorption solution passes from the inner pipe 25 into the lower end of a vapor lift tube 27 in thermal exchange relation with heating tube 11 at 28, as by welding, for example. Due to heating by fuel burner 13, for example, liquid raised by vapor-liquid lift action through tube 27 into the upper part of boiler 10. The liberated refrigerant vapor entering boiler 10 from the tube 27, and also vapor expelled from solution in the boiler, flows upwardly to the condenser 15, as previously explained.

The weakened absorption liquid, from which refrigerant vapor has been expelled, is conducted from boiler 10 through a conduit 29, outer passage or pipe 30 of liquid heat exchanger 26 and conduit 23 into the upper part of the absorber coil 22. The circulation of absorption liquid takes place by gravity from boiler 10 to the upper part of absorber coil 22 and is effected by raising of liquid by vapor-liquid lift action in lift tube 27. It will be seen that the conduit or connection 29 communicates with the boiler 10 so that the lower part 10′ thereof forms a liquid pocket between the region weak absorption liquid passes from the boiler into the connection or conduit 29. The lower part 10′ of the boiler 10 is also in thermal exchange relation with the heating tube 11 at 31, as by welding, for example. Such heating of absorption liquid at one side of the liquid body in the lower part 10′ of the boiler induces circulation of absorption liquid which is desirable in that it promotes expulsion of vapor in the boiler 10 in a regulated manner and avoids localized overheating of absorption liquid.

The outlet end of the condenser 15 is connected by an upper extension of conduit 16, vessel 32 and conduit 33 to the gas circuit, as at one end of gas heat exchanger 19, for example, so that any inert gas which may pass through the condenser 15 can flow into the gas circuit. Refrigerant vapor not liquefied in the condenser flows through the upper part of conduit 16 to displace inert gas in vessel 32 and force such gas into the gas circuit. The effect of forcing gas into the gas circuit in this manner is to raise the total pressure in the entire system, whereby an adequate condensing pressure is obtained to insure condensation of refrigerant vapor in condenser 15.

It will now be understood that the vapor expulsion unit of Fig. 1 is formed of a number of pipes and tubes which are heat conductively connected to one another. These pipes and tubes are embedded in suitable insulation 34 held in an upright metal shell or casing 35. While the casing 35 is diagrammatically shown in Fig. 1 with the bottom part being of larger cross-section than the upper part, this has been done simply to facilitate the illustration of the vapor expulsion unit and conduits connected thereto. In refrigeration apparatus constructed according to Fig. 1, the liquid heat exchanger 26 desirably is in the form of a helical coil snugly disposed about the heating tube 11 and pipe forming the boiler 10. In such construction the shell 35 may be of uniform cross-section throughout its height with all parts of the vapor expulsion unit or generator completely embedded in the insulation 34.

Within the practical limits to which vapor expulsion units or generators are insulated, there are always some heat losses from such units of refrigeration apparatus. Although such heat losses desirably are kept at a minimum, nevertheless they exist by reason of the difference between the temperature to which the heating tube 11 is heated by the source of heat external to the system and the ambient temperature of the environment in which the vapor expulsion unit is located. In the embodiment of Fig. 1, the boiler pipe 10 and vapor lift tube 27 are heat conductively connected to the exterior of the heating tube 11 along vertically extending lines more or less parallel to the axis of the heating tube. These heat conductive connections at 12, 28 and 31, which may be effected by welding as pointed out above, only occupy a small part of the outer peripheral surface of the heating tube 11 and are of a size commensurate with the capacity of the refrigeration system and conditions under which it is operated. By way of example, and without limitation, the heat conductive connections at 12, 28 and 31 may extend transversely about the heating tube 11 for a distance which is only about 5% of the circumference thereof.

By heat conductively connecting the boiler 10 and lift tube 27 to the heating tube 11 in the manner just explained, there is the requirement of heating certain regions of the heating tube to the requisite high temperature for successful operation of the refrigeration apparatus, that is, effect expulsion of vapor from absorption liquid and circulation of liquid in the absorption liquid circuit by vapor lift action. Since all regions of the heating tube are not directly connected to heat receiving parts of the vapor expulsion unit, heat losses by radiation and conduction inevitably occur. Further, some heat losses by radiation and conduction occur from other parts of the vapor expulsion unit or generator, such as, for example, the boiler, vapor lift tube and conduits connected to these parts. The heat losses described above may be referred to as heat which is dissipated from the vapor expulsion unit or generator and derived from the external heat source 13 in contradistinction to heat derived from within the system at internally heated zones which are formed and produced at places like a rectifier and analyzer, for example, to effect removal of absorption liquid vapor accompanying refrigerant vapor.

In the absorption liquid circuit circulation of absorption liquid is effected through and between boiler 10 and absorber coil 22, and the liquid heat exchanger 26 interconnecting these parts serves to exchange heat between relatively cool rich absorption solution flowing from the absorber vessel 21 and relatively warm weak absorption liquid flowing from boiler pipe 10. In refrigeration systems of the tube just described, the heat capacity of the rich absorption liquid exceeds that of the weak absorption liquid. This will be readily apparent when it is realized that, with a definite quantity of weak absorption liquid flowing for a given time through the liquid heat exchanger passage 30 toward the absorber coil 22 to absorb a definite quantity of refrigerant, the quantity of rich absorption liquid flowing in the same given time through the liquid heat exchanger passage 25 will exceed the quantity of weak absorption liquid by the quantity of refrigerant absorbed into solution in the absorber. Hence, when heat exchange is effected between all of the rich absorption liquid flowing from the absorber and all of the weak absorption liquid flowing from the vapor expulsion unit, the weak liquid by itself is not capable of heating the rich absorption liquid to the initial temperature of the weak liquid.

In accordance with this invention, in order to improve the balance between the heat capacities of the rich and weak liquids in the absorption liquid circuit and prevent heat, which is derived from a source external to the system, to be dissipated from the vapor expulsion unit or generator and go to waste, such dissipated heat is utilized to promote heating of absorption liquid enriched in refrigerant before heat exchange of such rich liquid with weak absorption liquid is completed and before introducing such rich liquid into the vapor expulsion unit.

In Fig. 1 I accomplish this by heat conducitvely connecting the lower heat input end of heating tube 11 at 36 to a part 24a of the conduit 24 through which enriched absorption liquid flows from absorber vessel 21 to the vapor lift tube 27 of the generator. The heat conductive connection at 36 may be effected by welding the conduit section 24a in the direction of its length to the outer exterior surface of the heating tube 11. In certain instances the conduit section 24a may simply be arranged to bear against and contact the heating tube 11. In any event, a suitable heat transfer path can readily be provided for utilizing heat dissipated from the heating tube 11 to heat rich absorption liquid before such liquid flows in thermal exchange relation with weak absorption liquid in the liquid heat exchanger 25.

Since the quantity of rich absorption liquid flowing through the inner pipe 25 of the liquid heat exchanger in a given time is greater than the quantity of weak absorption liquid flowing through the outer pipe 30 thereof, the heating of rich absorption liquid in the conduit section 24a in effect boosts the heat capacity of the weak absorption liquid. Stated another way, the heat capacity of the weak absorption liquid will be employed more effectively to bring the rich absorption liquid to a temperature nearer to the temperature at which weak absorption liquid enters the heat exchanger 26 due to heating of rich liquid in the conduit section 24a by heat dissipated from the heating tube 11 of the generator and derived from the heat source 13 external to the refrigeration system.

In order to insure that the weak absorption liquid will enter the upper part of absorber coil 22 at a sufficiently low temperature, the lower part of conduit 23 may have heat dissipating elements 38 affixed thereto to promote air cooling of weak liquid after leaving the heat exchanger 25.

In Fig. 2 another embodiment of the invention is illustrated in which parts similar to those shown in Fig. 1 are designated by the same reference numerals. In Fig. 2 the liquid heat exchanger 26a includes an inner pipe or passage 25a through which absorption liquid enriched in refrigerant flows from the absorber vessel 21 to the vapor lift tube 27 of the generator. Absorption liquid weak in refrigerant flows from boiler 10*a* through connection 29 into the first section 30*a* of the outer pipe or passage of the liquid heat exchanger.

After effectively giving up heat to rich absorption liquid flowing through the inner pipe 25*a* and about to enter the vapor lift tube 27, the partially cooled weak absorption liquid flows from the first section 30*a* through piping 39 which is of inverted U-shape form and both arms of which are shown heat conductively connected at 40, as by welding, for example, to the heating tube 11*a*. In this way the temperature of partially cooled weak absorption liquid is increased by heat dissipated from the heating tube 11*a*. The heated liquid is then conducted from piping 39 to the second section 30*b* of the outer pipe of the liquid heat exchanger, the additional heat capacity imparted thereto enabling such weak absorption liquid to promote effective heating of rich absorption liquid flowing into the inner pipe 25*a* of the liquid heat exchanger from the absorber vessel 21.

In certain instances, it may be desirable to heat conductively connect only one of the arms of piping 39 to the heating tube 11*a*. In any event, the piping 39 should extend upward from the connection 28 of lift tube 27 to heating tube 11*a* to a level which is below the liquid level A maintained in the boiler pipe 10*a*. Hence, absorption liquid can flow by gravity from the boiler pipe 10*a* through the first section 30*a* of the outer pipe of the heat exchanger to a sufficiently high level in the left-hand arm of piping 39 to spill over into the right-hand arm of the piping and continue flowing by gravity to the upper end of absorber coil 22.

In order to vent gas or vapor which may collect in the upper closed end of the inverted U-shape piping 39, such closed end is connected by a conduit 41 to the region of boiler pipe 10*a* which is above the liquid level therein and through which vapor flows to conduit 14 which in turn is connected to a condenser like the condenser 15 in Fig. 1, for example.

A further embodiment of the invention is illustrated in Fig. 3 in which parts similar to those shown in Figs. 1 and 2 are designated by the same reference numerals. In Fig. 3 absorption liquid enriched in refrigerant flows from absorber vessel 21 through conduit 24 and inner pipe 25*b* of liquid heat exchanger 26*b*. Rich absorption solution passes from the inner pipe 25*b* into the boiler 10*b* at a point 42 which is at a level below the liquid level in the absorber vessel 21 and below the surface level of the liquid column contained in the boiler.

Liquid flows from the lower closed end of boiler 10*b* into the lower end of a lift tube 27*b* in which liquid is raised by vapor-liquid lift action into the upper part of a standpipe or riser 43. The boiler 10*b* and lift tube are heat conductively connected at 12*b* and 28*b*, respectively, to heating tube 11*b*. The principal part of the generated vapor is expelled from solution in boiler 10*b*, and liquid of decreasing refrigerant concentration flows downwardly to the bottom closed end thereof into the lower end of lift tube 27*b*. The vapor which passes from the upper end of lift tube 27*b* enters standpipe 43 and flows from the upper end thereof into conduit 14 for flow toward the condenser together with vapor flowing from boiler 10*b*. The upper part of the pipe forming boiler 10*b*, at the region above the liquid level therein, is removed from the immediate vicinity of the heating tube 11*b* and out of thermal relation therewith and serves as a conduit for conducting vapor from the boiler proper to the vapor supply line or conduit 14.

The absorption liquid from which vapor has been expelled flows from standpipe 43 through the first section 30*d* of the outer pipe of liquid heat exchanger 26*b*, the parallel arms 39*c* and 39*d* of piping which is of inverted U-shape form, the second section 30*c* of the outer pipe of the liquid heat exchanger and conduit 23 into the upper part of an absorber coil like that shown at 22 in Figs. 1 and 2. In Fig. 3 the arm 39*c* is heat conductively connected at 44 to the upper extension of boiler pipe 10*b* which serves as a conduit for conducting vapor from the boiler to the vapor supply line 14, as explained above. The arm 39*d* is heat conductively connected at 40*c* to the heating tube 11*b*.

After weak absorption liquid is partially cooled by flowing in heat transfer relation with rich liquid in the upper or top section 30*d* of the outer passage of heat exchanger 26*b*, such partially cooled weak liquid flows upwardly in arm 39*c* in thermal exchange relation with the upper part of boiler pipe 10*b*.

The vapor generated in the boiler pipe 10*b* usually is a mixture of refrigerant vapor and absorption liquid vapor. When ammonia and water are employed as the refrigerant and absorption liquid, for example, the generated vapor usually is a mixture of ammonia vapor and water vapor. The latent heat of condensation resulting from condensation of water vapor is referred to as heat of rectification which is utilized to promote heating of weak absorption liquid in the arm 39*c*. Essentially, the portion of arm 39*c* heat conductively connected to the upper part of boiler pipe 10*b* at 44 constitutes a liquid cooled rectifier in which heat of rectification is given up to weak absorption liquid. The heated weak absorption liquid is then conducted through the upper closed end of the piping of inverted U-shape form and flows downwardly in the arm 39*d* in which heat dissipated from the heating tube 11*b* is given up to weak absorption liquid to promote further heating thereof before such heated weak liquid enters the lower or bottom section 30*c* of the outer pipe of the heat exchanger 26*b*. It will be understood that the heat of rectification given up to weak liquid in arm 39*c* is produced in an internally heated zone of the refrigeration system while the heat given up to weak liquid in arm 39*d* is heat dissipated from heating tube 11*b* and derived from a heat source external to the refrigeration system.

In view of the foregoing, it will be understood that in the different embodiments shown and described above, heat dissipated from the vapor expulsion unit or generator is effectively utilized either to heat rich absorption liquid directly or through the intermediary of weak absorption liquid. In any case, heating of such rich absorption liquid is effected at a region in its path of flow from such heated rich liquid subsequently flows in thermal exchange relation with weak absorption liquid while in poor heat conductive relation with the heating tubes 11, 11*a* or 11*b* and thereafter enters the vapor expulsion unit or generator. Also, in each particular case, depending upon the construction and arrangement of parts of the vapor expulsion unit or generator and the kind of heating medium employed to effect heating of the vapor expulsion unit, the extent of the heat conductive connection between the heat dissipating part and conduit for absorption liquid, and also the preferred location of such connection, are taken into consideration to insure proper operation of the refrigeration system under all operating conditions encountered and at the same time facilitate transfer to absorption liquid of heat which is dissipated from the highest temperature regions of the heat dissipating part and which otherwise would go to waste.

While several embodiments of the invention have been shown and described, it will be apparent that modifications and changes may be made without departing from the spirit and scope of the invention, as pointed out in the following claims.

What is claimed is:

1. In the art of refrigerating with a system employing an inert gas which includes the steps of heating a member at a place of heating by a source of heat external to the system, expelling vapor from absorption liquid at such place of heating while the liquid is in good heat conductive relation with said member, absorbing refrigerant into absorption liquid at a place of absorption, flowing absorption liquid weak in refrigerant from the place of heating to the place of absorption in a first path of flow, and flowing absorption liquid enriched in refrigerant from the place of absorption to the place of heating in a second path of flow in thermal exchange relation with liquid in the first path of flow, the improvement which comprises utilizing heat at the place of heating to heat absorption liquid in the second path of flow at a region thereof from which such heated liquid subsequently flows in thermal exchange relation with liquid in the first path of flow while in poor heat conductive relation with said member and thereafter enters the place of heating, and accomplishing such heating of absorption liquid in the second path of flow by conducting absorption liquid in one of said paths of flow in good heat conductive relation with said member.

2. The improvement set forth in claim 1 in which absorption liquid in the second path of flow, after such liquid passes from the place of absorption and before flowing in thermal exchange relation with liquid in the first path of flow, is conducted in good heat conductive relation with said member.

3. The improvement set forth in claim 1 in which absorption liquid in the first path of flow is conducted in good heat conductive relation with said member after first flowing in thermal exchange relation with liquid in the second path of flow, and thereafter flowing such heated absorption liquid in the first path of flow in thermal exchange relation with liquid in the second path of flow to transfer heat from the former to the latter.

4. In the art of refrigerating with a system employing an inert gas which includes the steps of maintaining a body of absorption liquid at a place of vapor expulsion, heating a member at a place of heating by a source of heat external to the system, expelling vapor from the liquid body by heat derived from said member, absorbing refrigerant into absorption liquid at a place of absorption, flowing absorption liquid weak in refrigerant from the place of vapor expulsion to the place of absorption in a first path of flow, and flowing absorption liquid enriched in refrigerant from the place of absorption to the place of vapor expulsion in a second path of flow in thermal exchange relation with liquid in the first path of flow, the improvement which comprises utilizing heat at the place of heating and derived from the source of heat external to the system of heat absorption liquid in the second path of flow at a region thereof from which such heated liquid subsequently flows in thermal exchange relation with liquid in the first path of flow while in poor heat conductive relation with said member and thereafter enters the place of vapor expulsion, and accomplishing such heating of absorption liquid in the second path of flow by conducting absorption liquid in one of said paths of flow in good heat conductive relation with said member.

5. The improvement set forth in claim 4 in which absorption liquid in the first path of flow is conducted in good heat conductive relation with said member, the heat derived from the place of heating by the absorption liquid in the first path of flow subsequently being transferred to liquid in the second path of flow while flowing in thermal exchange relation therewith.

6. In an absorption refrigeration system of the inert gas type, a generator for holding a body of absorption liquid, said generator including a heat receiving part from which heat is derived for expelling vapor from the body of absorption liquid, a source of heat external to the system for heating said heat receiving part, an absorber, a liquid heat exchanger, first conduit means including a first passage of said liquid heat exchanger for flowing liquid from said generator to said absorber, second conduit means including a second passage of said liquid heat exchanger for flowing liquid from said absorber to said generator, and means for transferring heat from said heat receiving part to liquid flowing in said second conduit means at a region thereof from which such heated liquid subsequently flows at least through a part of said second liquid heat exchanger passage before entering said generator, said last-mentioned part of said second liquid heat exchanger passage being in poor heat conductive relation with said heat receiving part, said last-mentioned heat transfer means including provisions for conducting liquid in one of said aforementioned conduit means in good heat conductive relation with said heat receiving part.

7. Apparatus as set forth in claim 6 in which said heat transfer means includes provisions for conducting liquid in said second conduit means, at a region thereof between said absorber and said liquid heat exchanger, in good heat conductive relation with said heat receiving part.

8. Apparatus as set forth in claim 7 in which said heat receiving part comprises a heating tube which is heated by said heat source external to the system, and said heat transfer means includes provisions for heat conductively connecting said heating tube with the region of said second conduit means between said absorber and said liquid heat exchanger.

9. Apparatus as set forth in claim 8 in which said heating tube is vertically disposed and the lower end thereof constitutes the heat input end, and said heat transfer means includes provisions for heat conductively connecting the lower heat input end of said tube with the region of said second conduit means between said absorber and said liquid heat exchanger.

10. Apparatus as set forth in claim 9 in which said first conduit means, at a region between said liquid heat exchanger and said absorber, is provided with heat dissipating elements.

11. Apparatus as set forth in claim 6 in which one of said liquid heat exchanger passages includes first and second sections and piping connecting said sections for conducting absorption liquid successively therethrough, said piping forming a part of one of said conduit means, and said heat transfer means includes provisions for conducting liquid in said piping in good heat conductive relation with said heat receiving part.

12. Apparatus as set forth in claim 11 in which said first liquid heat exchanger passage includes said first and second sections and said piping connecting the latter.

13. Apparatus as set forth in claim 12 in which said heat heat receiving part comprises a heating tube which is heated by the heat source external to the system, and said heat transfer means includes provisions for heat conductively connecting said heating tube and said piping.

14. Apparatus as set forth in claim 13 in which said heating tube is upright and said piping is of inverted U-shape having downwardly extending arms whose lower ends communicate with the first and second sections, respectively, of said first liquid heat exchanger passage, at least one of said arms being heat conductively connected to said heating tube.

15. Apparatus as set forth in claim 14 including means for venting gaseous fluid from the upper closed end of said inverted U-shaped piping.

16. Apparatus as set forth in claim 15 which includes conduit means for conducting vapor from said boiler, one of the arms of said inverted U-shaped piping being heat conductively connected to said last-mentioned conduit means and the other of said arms being heat conductively connected to said heating tube.

17. In absorption refrigeration apparatus having circuits for circulation of refrigerant, inert gas and absorption liquid, the circuit for circulation of absorption liquid including an absorber, liquid heat exchanger means and a vapor expulsion unit comprising a boiler, means for heating said boiler, said liquid heat exchanger means having one passage for conducting absorption liquid rich in refrigerant from said absorber to said vapor expulsion unit and another passage for conducting absorption liquid weak in refrigerant from said vapor expulsion unit to said absorber, a vapor supply line including piping communicating with said boiler for flowing vapor therefrom, said other liquid heat exchanger passage having first and second sections for conducting weak absorption liquid successively therethrough, conduit means segregated from the inert gas circuit for conducting weak absorption liquid from the first section of said other liquid heat exchanger passage into thermal exchange relation with vapor flowing through said piping and then to the second section of said other liquid heat exchanger passage for flow therethrough, and a vent to provide vapor communication between the upper part of said conduit means and said vapor supply line, said vent constituting the only provision for bringing weak absorption liquid in said conduit means in intimate physical contact with gaseous fluid circulating in the apparatus.

18. In absorption refrigeration apparatus having circuits for circulation of refrigerant, inert gas and absorption liquid, the circuit for circulation of absorption liquid including an absorber, liquid heat exchanger means and a generator comprising a boiler and a vapor lift pump, said absorption liquid circuit including connections for maintaining the liquid surfaces in said boiler and said absorber at essentially the same level, means for heating said boiler and pump, said liquid heat exchanger means having one passage for conducting absorption liquid rich in refrigerant from said absorber to said generator and another passage for conducting absorption liquid weak in refrigerant from said generator to said absorber, a vapor supply line including vertically extending piping communicating with said boiler for flowing vapor therefrom, said other liquid heat exchanger passage having first and second sections for conducting weak absorption liquid successively therethrough, conduit means segregated from the inert gas circuit for conducting weak absorption liquid from the first section of said other liquid heat exchanger passage into thermal exchange relation with vapor flowing through said piping and then to the second section of said other liquid heat exchanger passage for flow therethrough, said conduit means bringing the weak absorption liquid in thermal exchange relation with vapor at a region of said piping which extends vertically between the liquid surface in said boiler and the liquid level maintained in said generator by said pump, and a vent to provide vapor communication between the upper part of said conduit means and said vapor supply line, said vent constituting the only provision for bringing weak absorption liquid in said conduit means in intimate physical contact with gaseous fluid circulating in the apparatus.

References Cited in the file of this patent

UNITED STATES PATENTS

| | | |
|---|---|---|
| 2,002,958 | Maiuri | May 28, 1935 |
| 2,178,870 | Coons | Nov. 7, 1939 |
| 2,278,661 | Lenning | Apr. 7, 1942 |
| 2,284,691 | Strandberg | June 2, 1942 |
| 2,329,863 | Thomas | Sept. 21, 1943 |
| 2,402,416 | Kogel | June 18, 1946 |
| 2,623,366 | Edel | Dec. 30, 1952 |

FOREIGN PATENTS

| | | |
|---|---|---|
| 666,739 | France | Oct. 4, 1929 |

UNITED STATES PATENT OFFICE

CERTIFICATE OF CORRECTION

Patent No. 2,797,555 July 2, 1957

Wilhelm Georg Kogel

It is hereby certified that error appears in the printed specification of the above numbered patent requiring correction and that the said Letters Patent should read as corrected below.

Column 1, line 36, for "utilizied" read -- utilized --; column 2, line 49, after "liquid" insert -- is --; column 6, line 43, after "from" insert -- which --; column 7, line 43, for "of" read -- to --.

Signed and sealed this 13th day of August 1957.

(SEAL)

Attest:

KARL H. AXLINE

Attesting Officer

ROBERT C. WATSON

Commissioner of Patents